United States Patent [19]

Cooley

[11] Patent Number: 5,325,642
[45] Date of Patent: Jul. 5, 1994

[54] GEODESIC HAZARDOUS WASTE CONTAINMENT BUILDING

[76] Inventor: Warren L. Cooley, P.O. Box 2392, Davis, Calif. 95617

[21] Appl. No.: 822,071

[22] Filed: Jan. 17, 1992

[51] Int. Cl.$^5$ .......................... E04H 7/22; E04B 1/32; E04B 1/98
[52] U.S. Cl. ...................... 52/811; 52/79.4; 52/167 R; 52/169.6; 52/236.2; 52/247; 52/249; 405/128
[58] Field of Search ............... 52/80, 81, 79.4, 169.6, 52/236.2, 247, 245, 167 R, 167 RM, 167 DF, 246, 249; 405/53, 55, 56, 128, 129

[56] References Cited

U.S. PATENT DOCUMENTS

| | | | |
|---|---|---|---|
| 2,986,241 | 5/1961 | Fuller | 189/34 |
| 3,197,927 | 8/1965 | Fuller | 52/81 |
| 3,793,145 | 2/1974 | Jordan et al. | 52/249 |
| 3,916,578 | 11/1975 | Forootan et al. | 52/80 |
| 3,968,190 | 7/1976 | Stewart | 52/167 R |
| 4,063,394 | 12/1977 | Feurlien | 52/294 |
| 4,644,714 | 2/1987 | Zavas | 52/167 |
| 4,680,901 | 7/1987 | Armitage | 52/81 |
| 4,784,802 | 11/1988 | Mallory et al. | 252/633 |
| 4,844,840 | 7/1989 | Feizollahi | 252/633 |
| 4,911,576 | 3/1990 | Hoffine | 405/128 |
| 5,097,640 | 3/1992 | Skolnick et al. | 52/81 |

FOREIGN PATENT DOCUMENTS

| | | | |
|---|---|---|---|
| 44582 | 6/1961 | Poland | 52/167 RM |
| 751652 | 7/1956 | United Kingdom | 405/55 |

*Primary Examiner*—Michael Safavi

[57] ABSTRACT

A Geodesic Hazardous Waste Containment Building provides a means for the long term isolation of toxic waste from the environment. The invention comprises a primary containment sphere, a surrounding secondary containment sphere and a means for protecting the contents of the building from natural disaster, specifically earthquake. The invention includes all of the advantages of geodesic construction providing the opportunity for cost-effective, modular construction with inexpensive building materials such as concrete. The invention further provides a double barrier of protection from environmental contamination. The invention also makes possible easy inspection for leaks and a means of controlling and containing leaks should they occur.

7 Claims, 3 Drawing Sheets

GEODESIC HAZARDOUS WASTE CONTAINMENT BUILDING

BACKGROUND

1. Field of Invention

This invention relates to geodesic structures specifically the use of these structures for the long term containment and isolation of hazardous waste material from the environment.

2. Cross Reference and Related Applications

This invention introduces a new use for geodesic structures and those structural means which can most broadly be referred to as tension structures. The basis of this invention is drawn from the inspiration and work of Dr. R. Buckminster Fuller. Embodiments of my invention are related but not limited to the following Patents and references. Geodesic Dome, U.S. Pat. No. 2,682,235, Jun. 29, 1954, Monohex (Geodestic Structure) U.S. Pat. No. 3,197,927, Aug. 3, 1965, Aspension (Geodesic Structure) U.S. Pat. No. 3,139,957, Jul. 7, 1964, Octet Truss U.S. Pat. No. 2,986,241, May 30, 1961, Earthquake Protective Column Support U.S. Pat. No. 4,644,714, Feb. 24, 1987.

3. Discussion of the Prior Art

Heretofore the containment and isolation from the environment of hazardous waste material has been undertaken primarily by the means of depositing toxic waste material in landfills. Recently, legislation has stimulated advances in the technology of the treatment of hazardous waste. Regardless of the advances in treating hazardous wastes, material residues will continue to require containment and isolation from the environment. The nature of the stategies and the artifacts previously used for toxic waste containment leaves them subject to leaking into the environment or subject to having the environment leak into deposits of waste. Furthermore, deposits of hazardous waste have been subject to damage resulting from natural cycles and disasters, i.e. rainwater, earthquakes, hurricanes, tornadoes, floods. In addition, the long term maintenance, inspection and repair of toxic waste deposits has been difficult. Many times the detection of damage or leakage has not been possible until an invasion of the biosphere by toxic residues has occurred. The degree of protection provided by the vessels and the landfills containing toxic waste is related in part to the surface area of the vessel or the landfill through which toxic waste might be diffused. Until now, very little consideration has been given to the potential of utilizing the most efficient, hence environmentally safest, ratio of surface area to enclosed volume.

Geodesic building enclosures have been used to meet a wide variety of requirements for enclosing a volume of space for the protection of humans, animals and artifacts from the environment. All geodesic structures have a spectrum of features which make them particularly unique. Without limiting the unique features of this class of structure, several features which are specifically appropriate are 1. the aspect of tension, which provides a particularly favorable weight to strength ratio, 2. the adaptablity to any size, 3. the advantageous relationship of enclosed volume to surface area that exists in spherical and hemispherical geodesic structures, 4. the unique ability of geodesic and tension structures to withstand earth tremors and other natural disasters. My invention is a new use for geodesic spheres and domes utilizing these structures as a uniquely efficient and safe means for the long term protection of biosphere from hazardous waste.

OBJECTS AND ADVANTAGES

An object of my invention is to provide a safe, cost-effective, long term, natural-disaster resistant method for containing and isolating hazardous waste materials from the biosphere.

Accordingly several advantages of my invention are the result of utilizing the unique features of geodesic structures. The advantage of relying on the tensile strength of the materials comprising any embodiment of my invention allow for great economies of cost, manufacture, assembly and weight. It is an object of the embodiment of the invention that it can be substantially manufactured in components off-site and, assembled in a variety of sizes, enhancing the inventions cost-effectiveness. In addition the embodiment of the invention allows for the use of concrete as a major component of the construction material. Used in conjunction with steel and plastic membranes there are significant advantages in cost-effectiveness and durablity which are very important advantages of the invention.

It is a further advantage of the invention that it holds its position in the biosphere not only because of the gravitational forces exerted on it but also because it is suspended in tension in relationship to the earth and therefore is additionally stabilized against damage that could result from earthquake. Another advantage of the invention is that potential damage from earthquake has been reduced by a designed redundancy in the column and cable members which support the invention. It has long been understood that geodesic dome structures are particularly stable in high winds such as those produced in hurricanes and tornados. This reduction in the vunerability of my invention to damage from natural disasters makes possible the location of hazardous waste containment sites in areas which would be deemed unsuitable for other types of containment facilities.

A further significant advantage of my invention is its spherical shape. This shape provides the most favorable relationship between the ratio of the volume of enclosed space to the surface area exposed to an outside environment. The efficiency and safety with which the invention operates as a barrier between the toxic waste contained therein and the biosphere will at least in part be a function of the surface area through which material can diffuse. The minimum surface area relative to the enclosed volume is an important object of the invention.

A toxic waste containment vessel must in many cases have a design life of hundreds, perhaps even thousands, of years. It is also critical that the integrity of the vessel be easily maintained, inspected and repaired. It is a further object of the invention that easy maintenance, inspection and repair can take place between the primary environmental barrier and the secondary environmental barrier. Therefore early detection of breaches in the integrity of the structure can be serviced and cleaned up prior to compromise of the secondary containment barriers. The spherical shape also provides for the focusing or channeling of any spill or seepage towards the bottom center point producing the advantage of greater security against leakage and easier inspection. This is an imperative advantage in cases were exceptionally toxic wastes are being isolated from the biosphere.

A further object of this invention is that its theoretically unlimited size can be used to advantage. Society can build increasingly larger embodiments of this invention systematically moving the most dangerous and toxic materials to newer and larger structures thereby concentrating hazardous materials to areas of the earth most suitable for this use. In this process the advantage of producing ever increasing volumes of containment and an ever decreasing ratio of exposed surface area thereby constantly reducing, over the generations, the potential for contamination of the biosphere.

Another object of my invention is that it provides the means for establishing and maintaining physical barriers which will be very difficult to breach in any unauthorized manner therefore enhancing the security of the enclosed hazardous waste material.

In recent years, society has begun to react negatively in response to the proposed location of hazardous waste sites. This is popularly characterized as the "not in my backyard syndrome". The obvious safety and security advantages of my invention when taken together with the naturally pleasing asethetic appearance of geodesic dome structures makes the community acceptance of a hazardous waste site more favorable. It is the hope of this inventor that over the generations society will learn to produce less and less toxic waste. However, these dramatic advantages are so important that it may be a solution to the long-felt need for reliable perpetual storage and containment of society's most toxic waste products.

Further objects and advantages of my invention will become apparent from the consideration of the drawings and ensuing description of it.

BRIEF DESCRIPTION OF THE DRAWINGS

The foregoing and other objects, features and advantages of the invention will become more fully understood from the following description of a preferred embodiment of the invention as illustrated in the accompanying drawings in which like reference characters refer to the same parts throughout the different views. The drawings are not necessarily to scale, emphasis instead being placed upon illustrating the principles of the invention.

Figure 1:
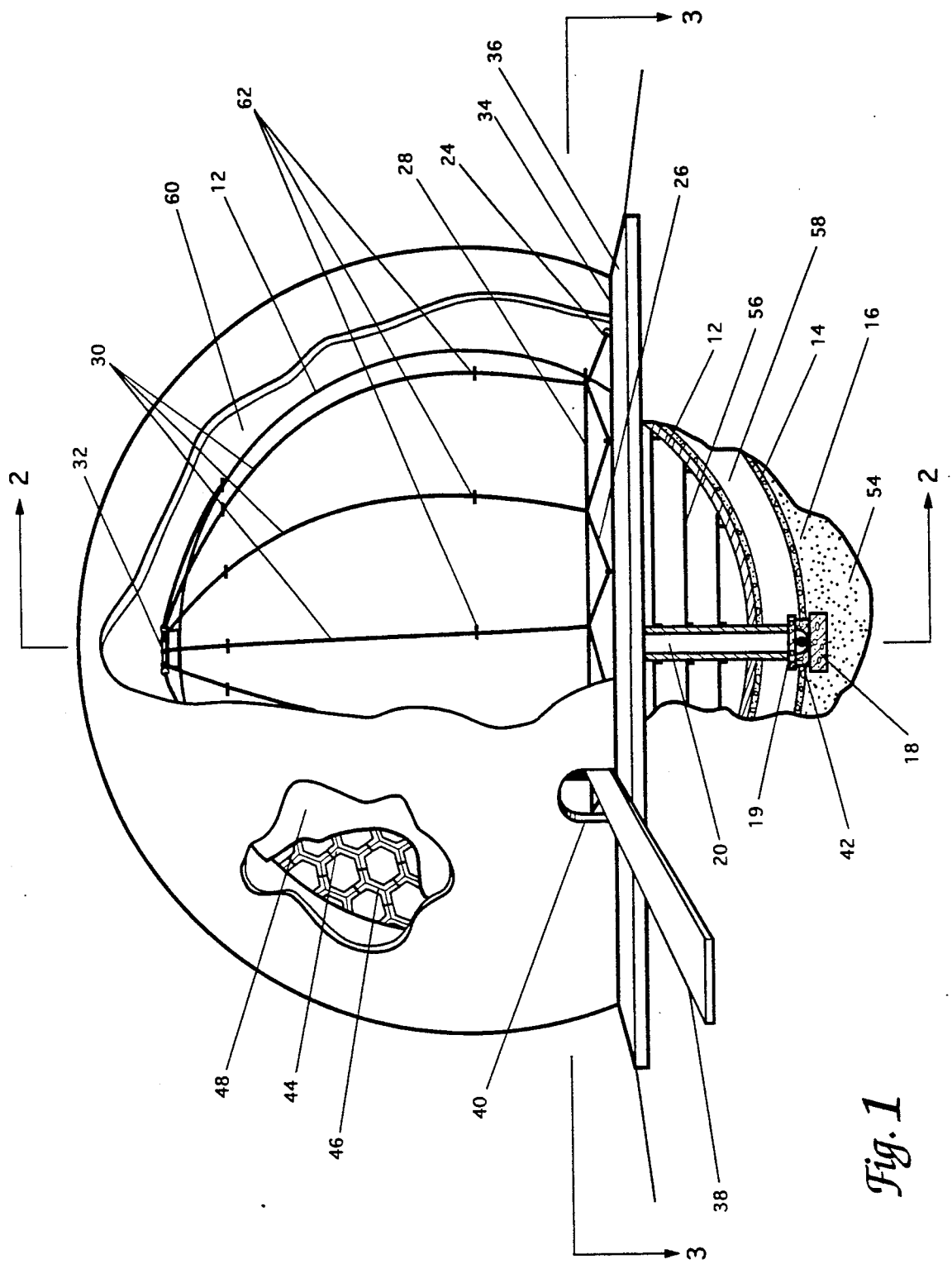
FIG. 1 is an elevation perspective of this invention: the geodesic hazardous waste containment building with portions of the outer dome cut away to reveal the configuration of the inner sphere structural and support system and a portion of the surrounding earth cut away to reveal the below grade details of the underdrain containment shell and the inner sphere support system.

DRAWING REFERENCE NUMERALS 10 above grade outer dome secondary containment envelope
12 primary inner containment sphere
14 below grade secondary containment dome envelope
16 gravel drainage sub-base
18 vertical column foundation footing
19 vertical support column base footing
20 vertical column and elevator shaft
21 elevator
22 horizontal cable anchor footings
24 horizontal cable anchor ring
26 horizontal support cables
28 circumference cable
30 vertical support cables
32 column cable harness
34 anchor apron
36 apron drain pad
38 movable access ramp
40 access door
42 vertical column foot and shoe for earthquake protection
44 geodesic sphere compression member
46 geodesic sphere tension member
48 reinforce concrete shell containment covering
50 vibration isolation connection joining floor and sphere
52 connection joining floor and vertical support column
54 earth
56 octet truss floor member
58 below grade safety and inspection conduit
60 above grade safety and inspection conduit
62 attachment vertical cable to containment structure
64 interior containment space

DESCRIPTION OF PREFERRED EMBODIMENTS OF THE INVENTION

Figure 2:
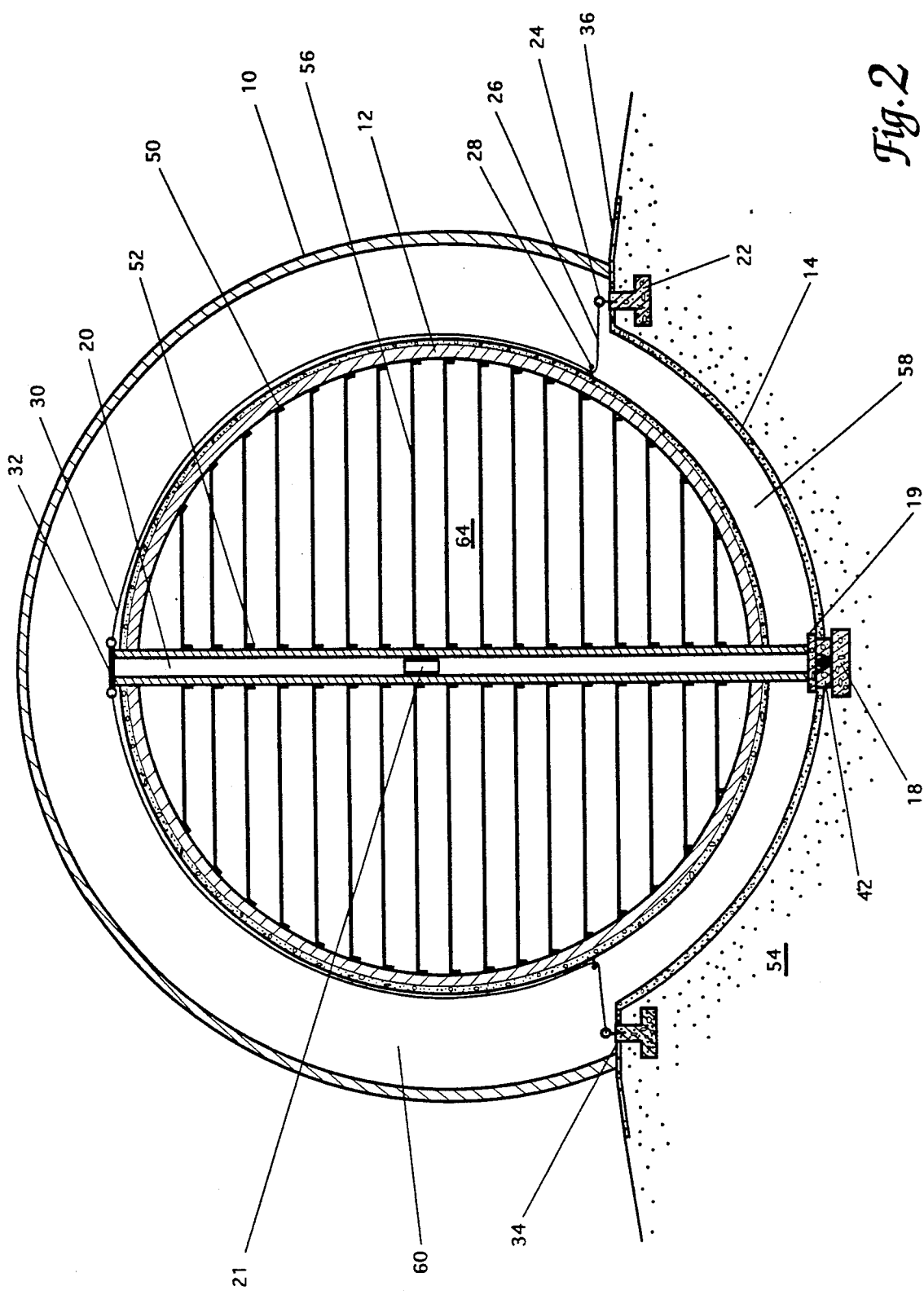
FIG. 2 is a cross-sectional view of the invention divided at section line 2—2 to reveal the details of the interior spaces comprising the geodesic hazardous waste containment building.

Referring to FIG. 1: geodesic hazardous waste containment building comprises an above grade outer dome secondary containment envelope 10 joined to the earth at its base by a concrete apron drain pad 36 which is graded for drainage of rainwater and snow away from the center of the building. The outer dome 10 may be constructed with materials that provide a sealed barrier to the environment. The outer dome 10 may also be constructed in a variety of geodesic patterns. In order to provide a reasonably stable temperature in the interior space, the outer dome 10 should have a light color or reflective exterior and may be insulated. Below grade, the geodesic hazardous waste containment building of FIG. 1 comprises a concrete or like material secondary containment dome envelope 14. To insure proper drainage and to avoid the upward hydraulic migration of ground moisture the below grade secondary containment dome envelope 14 nests on a drainage sub-base 16 of gravel or crushed rock. At the center and lowest below-grade point of the containment building of FIG. 1 is a vertical column foundation footing 18 which supports a vertical column foot and shoe 42 configuration designed for earthquake protection. There are numerous configurations and designs for protection of columns from the effects of earthquake. Of the numerous embodiments of this type of invention U.S. Pat. No. 4,644,714, Earthquake Protective Column Support, Victor A. Zayas, inventor is perhaps best suited for the purposes of my invention. The vertical column foot and shoe 42 supports the vertical column base footing 19. The vertical column 20 may be configured as an elongated hollow rectangular shaft suitable for use as a passageway for an elevator lift, thereby providing access from one level to the next. Completely enclosed by and approximately concentric to the above-grade outer dome 10 and below-grade dome 14 is the primary inner containment sphere 12. The vertical column and elevator shaft 20 bisects the inner containment sphere 12 on a vertical axis exiting the sphere at both its upper and lower poles. Attached to the top of the vertical column 20 is a configuration of cable harness 32. The inner containment sphere 12 is supported on the vertical column 20 by a system of vertical support cables 30 which radially traverse the outside curvature of the sphere 12 being fastened by attachments 62 to tension members 46 of the inner sphere 12 at several points and finally terminating with an attachment to a cable 28 which traverses the circumference of the sphere in a plane below and parallel the equator of sphere 12. A redudacy in the safety of the cable support system may be provided by a basket-like network of cables joined to cable 28 and running under sphere 12. The inner containment sphere 12 is suspended at an appropriate distance from both the above grade dome 10 and the below-grade dome 14 so that below and above-grade safety and inspection conduits 58 and 60 are created. Referring to FIG. 2 concentric to the inner containment sphere 12 are a plurality of horizontal cable anchor footings 22 which are positioned in the earth outside of the upper edge of the below grade dome 14 and fixed in place by an apron pad 34 of concrete which runs completely around the upper edge of the below grade dome 14. Attached to the cable anchor footings 22 at the surface of apron pad 34 are an equal number of cable anchor rings 24. The inner containment sphere 12 is supported laterally by a system of approximately horizontal support cables 26 which are fixed between anchor rings 24 and circumferance cable 28 in a triangulate network. Referring to FIG. 1: the preferred embodiment of inner sphere 12 is constructed in a manner best described in U.S. Pat. No. 3,197,957, MonoHex Geodestic Structure, R. Buckminster Fuller, comprises a concrete compression member 44 a steel cable or rod tension member 46 and a reinforced concrete shell 48. However, inner sphere 12 maybe constructed in a variety of geodesic patterns and with a variety of materials as may be appropriate to the specific materials contained therein. In addition, it maybe appropriate to incorporate a membrane liner in the shell design to increase its durability and reliablity. The interior containment space 64 can be accessed through a passage way 40 in the walls of the outer dome 10 and inner sphere 12. Movable ramp 38 provides a bridge between the upper edge of the below grade containment dome 14 and the passageway 40 in the wall of inner sphere 12. The interior space 64 of the inner sphere 12 is divided horizontally into plurality levels by a system of octet truss flooring members 56 (U.S. Pat. No. 2,986,241) which are attached at their perimeters to the wall of inner sphere 12 with an appropriate vibration isolation device 50 and joined to the vertical column 20 by an appropriate connection.

The operation of geodesic hazardous waste containment building is best understood in relationship to the need to contain and isolate toxic materials from the earth 54 for very long periods of time. As per the above description of the physical characteristics of the invention refer to FIG. 1. The geodesic hazardous waste containment building is located at a point on the earth 54 with the appropriate geological features. Toxic waste encapsulated in portable containers or barrels is transported to the location of the building in FIG. 1 and trucked or carried into the interior space 64 of the inner sphere 12 via the movable ramp 38 and access passageway 40. The encapsulated material is moved to the appropriate level for permanent storage via the elevator 21. In this manner, the entire volume of interior space 64 can be filled with containers of toxic material. Once the inner containment sphere 12 is fully loaded, the passageway through the inner sphere wall can be sealed in an appropriate manner. The movable ramp 38 can be removed, and the space occupied by the below grade safety and inspection conduit 58 provides a moat like barrier to access. The passageway in the outer dome 10 wall can be sealed in an appropriate manner and the space occupied by the above and below grade conduits 58 and 60 may be pressurized with an inert gas to prevent or retard chemical reaction and as a means of leak detection. Over time it may be appropriate to inspect the above-and below-grade conduits 58 and 60 for leaks or breaches in the integrity of the primary containment sphere 12. This being the case, suitable precautions can be taken by men or robots in making these inspections. Should leaks occur they will most probably be detected at the lowest point of the inner sphere 12 and thereby be confined by the barrier to the biosphere provided by the secondary containment dome 14. Upon detection leaks maybe easily be controlled, contained and repaired without having to remove the stockpile of toxic waste confined above in containment sphere 12, thereby adding a significant degree of safety and economy to the containment of hazardous waste. Of concern in the long-term containment and isolation of toxic waste is the potential that natural disaster will effect a breach in the containment building. In this case a serious threat is earthquake. The geodesic hazardous waste containment building anticipates this threat and provides design solutions to the problem. A feature of the geodesic construction is excellent resistance to damage caused by earthquake. In addition, the hazardous waste materials contained therein are isolated from tremors by a system of specially designed column supports as in the vertical column foot and shoe 42 configuration. Additionally a support network of triangulated, approximately horizontal cables 26 buffer against the lateral movement of the building and vibration isolation connections 50 between the flooring members 56 and the tension members 46 of the inner sphere 12 act to protect the contents of the building from earthquake.

Figure 3:
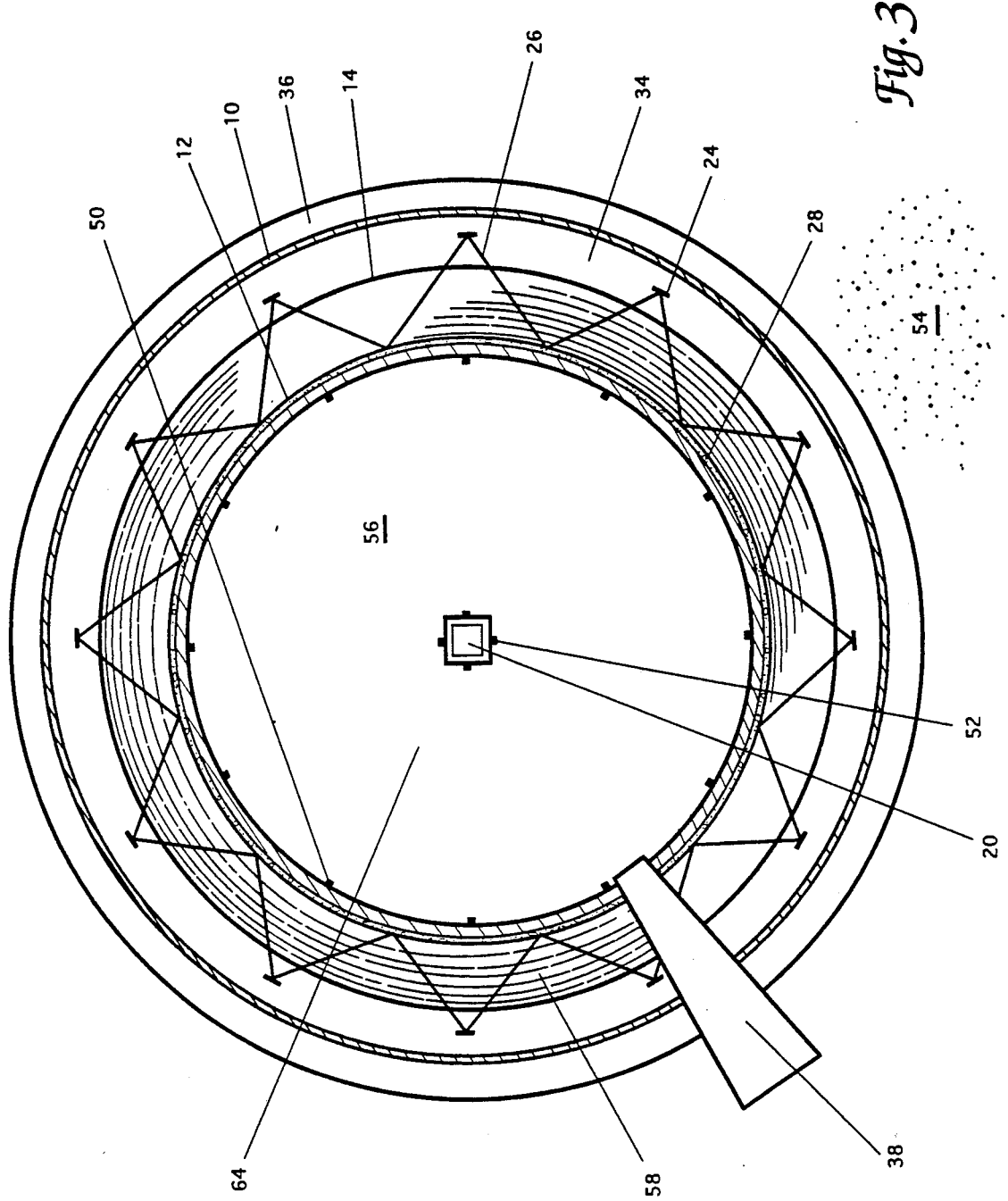
FIG. 3 is a cross-sectional view of the invention divided at section line 3—3 to reveal additional features comprising the geodesic hazardous waste containment building.

Thus the reader will see that the geodesic hazardous waste containment building of the invention shown in FIG. 1, 2 and 3 provides a unique, reliable, cost-effective, long term solution to the long-felt problem of isolating toxic material from the environment and provides society with an important solution to a dangerous problem.

While the invention has been particularly shown and described with reference to preferred embodiments thereof, it will be understood by those skilled in the art that various changes in the form, details, size and materials may be made therein without departing from the spirit and scope of the invention as defined by the claims.

I claim:

1. A spherical building for the containment of hazardous waste material comprising:
 a) a vertical elongated column member contacting the earth,
 b) an inner geodesic spherical enclosure defining an interior space and supported by said elongated column member,
 c) an outer above grade geodesic dome structure,
 d) an outer below grade dome structure,
 e) a means for supporting said inner geodesic spherical enclosure in a position approximately concentric to said outer above grade geodesic dome structure and said outer below grade dome structure, f) a conduit surrounding the inner spherical enclosure and defined by the concave surfaces of the outer above and below grade dome structures, whereby said spherical building provides a plurality of barriers for the containment of hazardous waste materials.

2. A spherical building for the containment of hazardous waste material as recited in claim 1 in which a vertical elongated column member of said building further comprises:
 a) an elongated vertical space surrounded by rigid structural members,
 b) a means to move an elevator along said elongated vertical space,
 c) a means to attach a plurality of horizontal members to said vertical elongated column members,
 d) a base connecting the vertical elongated column members to the earth and providing a means for earthquake protection.

3. A spherical building for the containment of hazardous waste material as recited in claim 1 in which an inner geodesic spherical enclosure of said building further comprises:
 a) a means for providing at least one passageway to the interior space,
 b) a means for dividing said interior space horizontally into a plurality of floor levels,
 c) a vertical elongated column member providing a means to support said inner geodesic spherical enclosure,
 d) a reinforced concrete shell.

4. A spherical building for the containment of hazardous waste material as recited in claim 1 in which an outer above grade geodesic dome structure of said building further comprises:
 a) a surrounding drainage apron of rigid material supporting said outer above grade dome structure,
 b) a passageway to through said outer above grade dome structure,
 c) a concave surface oriented towards the center of the earth.

5. A spherical building for the containment of hazardous waste material as recited in claim 1 in which an outer below grade dome structure of said building further comprises:
 a) a concrete dome shaped envelope with the convex surface oriented towards the center of the earth,
 b) a drainage sub-base supporting said concrete envelope.

6. A spherical building for the containment of hazardous waste material as recited in claim 1 in which a means for supporting the outer domes and the inner spherical structure of said building in a concentric relationship further comprises:
 a) an elongated vertical member bisecting said inner sphere at its upper and lower poles and in contact with the earth,
 b) a network of vertical and horizontal cables attached to the inner sphere,
 c) a plurality of anchor rings attached to the earth by means of a footing and arranged approximately concentric to the inner sphere,
 d) a plurality of horizontal cables attached to said anchor rings.

7. A spherical building for the containment of hazardous waste material as recited in claim 1 in which a conduit of said building further comprises a passageway able to accommodate the movement of humans and equipment.

* * * * *